United States Patent [19]

Bertini

[11] 4,141,260
[45] Feb. 27, 1979

[54] APPARATUS FOR MAKING SAW BLADES

[76] Inventor: Millo Bertini, 679 Garden St., Trumbull, Conn. 06611

[21] Appl. No.: 753,733

[22] Filed: Dec. 23, 1976

[51] Int. Cl.² .......................................... B23D 65/00
[52] U.S. Cl. ................................... 76/25 R; 72/342
[58] Field of Search ................. 76/25 R, 112; 83/846, 83/847; 72/301, 342, 295

[56] References Cited

U.S. PATENT DOCUMENTS

| 566,865 | 9/1896 | Morrish | 83/846 |
| 2,477,020 | 7/1949 | Van Sant | 72/342 |
| 2,710,501 | 6/1955 | Hull | 76/112 |

Primary Examiner—Harold D. Whitehead
Assistant Examiner—Roscoe V. Parker
Attorney, Agent, or Firm—Arthur T. Fattibene

[57] ABSTRACT

An apparatus and method of making a continuous saw blade having stepped saw segments whereby the cutting teeth in each segment define a cutting edge which is inclined relative to a back edge so that the respective teeth are rendered self-feeding during a cutting operation. The apparatus includes a moveable carriage having a pair of clamps mounted thereon for gripping a saw blade to be formed therebetween. The clamps are formed to effect the heating of the saw blade clamped therebetween, and operated to impart a lateral offset in the blade as the blade is being formed. The back edge of the respective offset segments are then trimmed to define a back edge which is coincidental for the length of the saw blade and the cutting edge inclined to the back edge in each segment so as to render the cutting teeth of each segment self-feeding during a cutting operation.

16 Claims, 6 Drawing Figures

FIG. 3
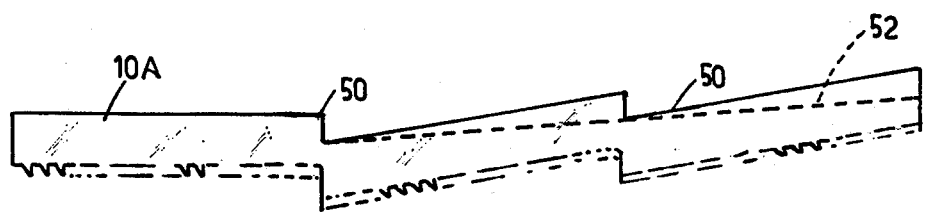
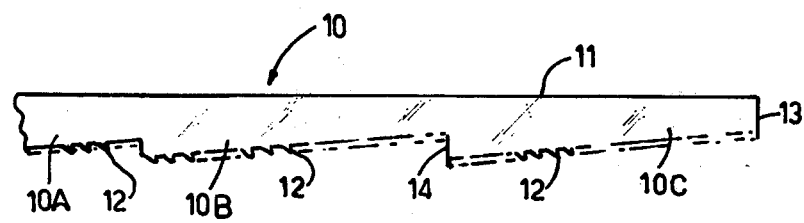
FIG. 4
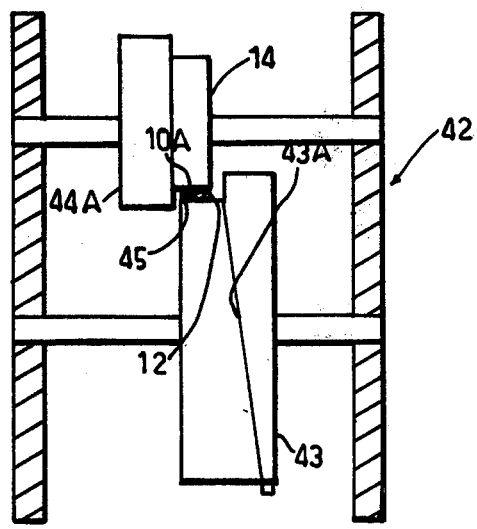
FIG. 5
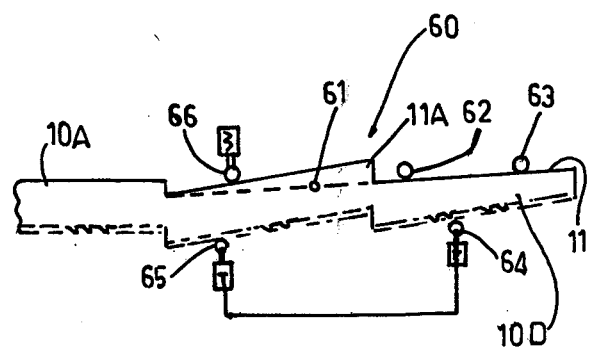
FIG. 6

APPARATUS FOR MAKING SAW BLADES

RELATED APPLICATION

This application relates to a method of making stepped saw blades of the type described in a co-pending application, Ser. No. 604,431 filed Aug. 13, 1975, now U.S. Pat. No. 4,023,448.

PROBLEM AND PRIOR ART

Heretofore saw blades have been commonly formed so that the cutting teeth terminate in a line which defines the shortest distance between the leading and trailing ends of a saw blade; i.e., generally in a line parallel to the back edge of the blade. Saw blades having teeth so formed cut by scratching the workpiece rather than by cutting. As a result, a considerable amount of pressure is required to be applied to perform the cutting operation. Such excessive pressure can be detrimental to the life of the saw blade because such applied pressure frequently causes the saw blade to twist and/or distort. This also causes the accuracy of the cut to be adversely affected. In applicant's co-pending application, Ser. No. 604,431, filed Aug. 13, 1975, there is disclosed an improved saw blade having a series of stepped segments wherein the teeth of the respective segments are progressively disposed relative to the back edge of the saw so as to render the teeth of a saw blade so formed self-feeding. The present application is thus directed to an apparatus whereby such saw blade can be economincally produced in a continuous operation.

OBJECTS

An object of this invention is to provide a relatively simple apparatus for the continuous manufacture of a stepped saw blade wherein the cutting teeth of the respective segments are rendered self-feeding during a cutting operation.

Another object is to provide an apparatus which can be readily utilized in conjunction with an apparatus conventionally employed for making saw blades.

Another object is to provide an apparatus and method whereby conventionally made saw blades can be readily fabricated into a saw blade having one or more connected saw segments in which the teeth of each segment are rendered self-feeding during use.

BRIEF SUMMARY OF INVENTION

The foregoing objects and other features of this invention are attained by an apparatus and method of working a saw blade which has been made by known techniques. The apparatus includes a moveable carriage having a clamping station thereon which includes a pair of clamps for receiving a conventionally formed saw blade. The respective clamps include relatively moveable jaw members activated between a gripping and non-gripping position by a piston and cylinder assembly. At predetermined intervals the clamps are activated to grip the saw blade therebetween. The respective jaw members are associated with a heater which is actuated in timed sequence to the gripping of the saw blade. Upon the saw blade being heated to a predetermined temperature, one of the clamps is shifted laterally relative to the other clamp whereby the saw blade is laterally offset. In effecting the offset, the offset portion is disposed at a predetermined angle relative to the preceeding blade segment. During the gripping, heating and offsetting of the blade, the carriage is being advanced a distance equal to a predetermined length. When the carriage has reached the limit of its travel, the clamps are deactivated to release the saw blade whereupon the carriage is returned to its start position to repeat the cycle. Downstreamwise a cutter is provided to trim the back edge of the blade so as to define a back edge which is coincidental to each of the respective blade segments formed. Thus a continuous saw blade is formed having connected stepped segments wherein the cutting teeth in each segment are progressively inclined relative to the coincidental back edge of the blade so that the teeth of each segment are rendered self-feeding during a cutting operation. Subsequent to the trimming operation, the stepped saw blade may be subjected to a heat treatment and/or rolling operation, if necessary.

FEATURES

A feature of this invention resides in a relatively simple and inexpensive apparatus for shaping a conventionally made saw blade into a saw blade having one or more stepped segments wherein the cutting teeth are progressively disposed between the leading and trailing ends of each blade segment so as to render the teeth self-feeding during a cutting operation.

Another feature resides in the provision of an apparatus whereby the apparatus for stepping a saw blade can be utilized in the production line operation of saw blade making machines.

Another feature of this invention resides in the provision of an apparatus and method for making an improved stepped saw blade at a speed comparable to the speed of a conventional or known saw blade milling or processing apparatus.

Another feature of this invention resides in the provision of an apparatus having a plurality of in line stations to effect the sequential operations for transforming a conventionally made saw blade into a stepped saw blade having a self-feeding teeth configuration at saw blade processing speeds.

Other features and advantages will become more readily apparent when considered in view of the drawings and specification in which:

FIG. 3 is an enlarged, exaggerated detail plan view of saw blade offset according to this invention.

FIG. 4 is a detail side view of a completed blade made by the present invention.

FIG. 5 is a sectional view taken along line 5—5 on FIG. 2 illustrating an embodiment of a shear means utilized by the present invention.

FIG. 6 is a plan view of a modified cutting station.

DETAILED DESCRIPTION

Figure 1:
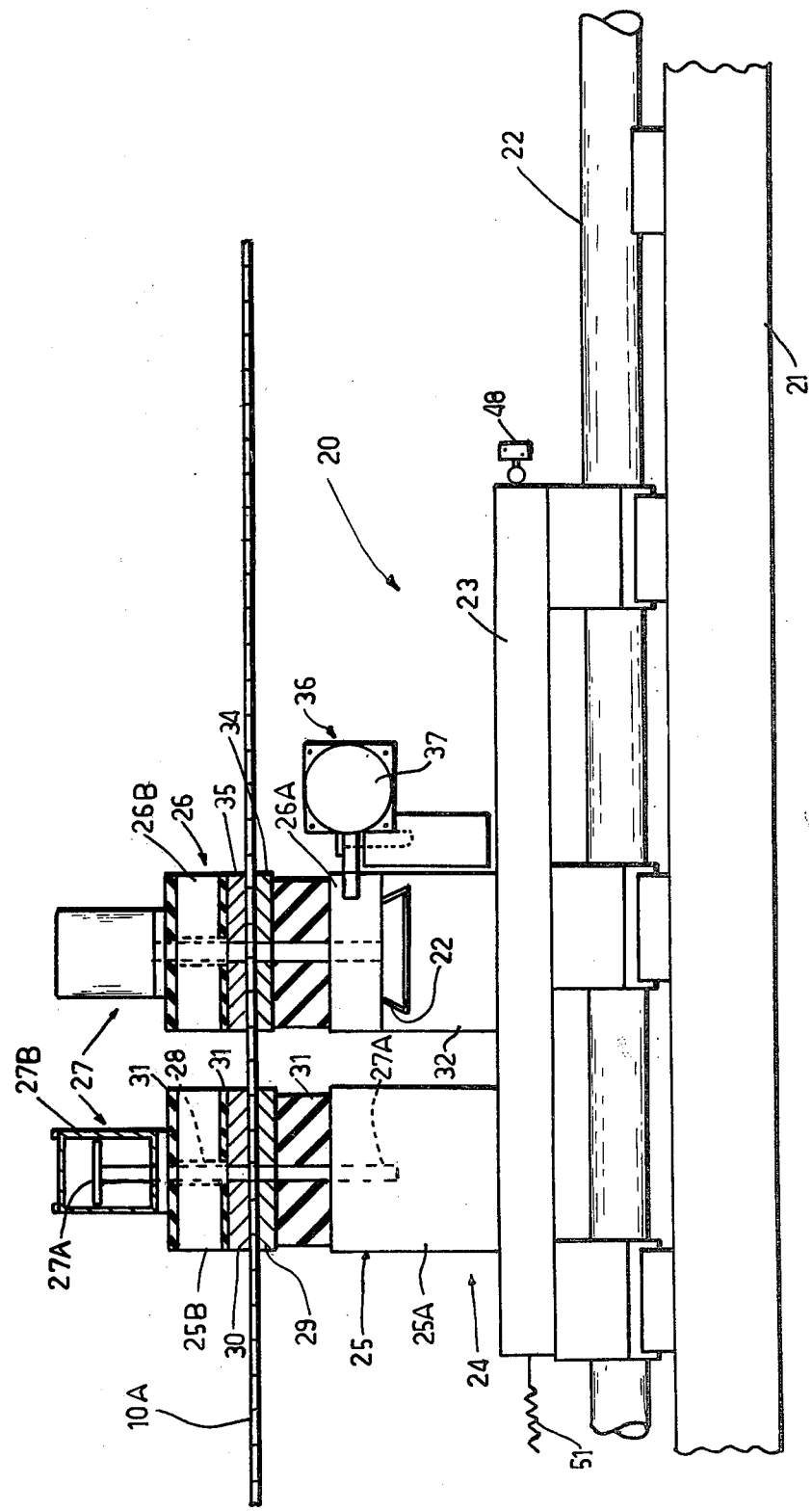
FIG. 1 is a side elevation view of an apparatus embodying the present invention.

Referring to the drawings, there is illustrated an apparatus for making a stepped saw blade; i.e., a saw blade 10 (FIG. 4) having one or more connected saw segments, e.g., 10A, 10B, 10C. Such blade 10 includes a back ege 11 which is coincidental to each of the respective saw segments, 10A, 10B, 10C with the cutting teeth 12 of each segment being inclined relative to the back edge 11 of the respective segments 10A, 10B, 10C. As shown, the respective teeth 12 in each segment 10A, 10B, 10C, are progressively sloped so that a cross-sectional section of the blade progressively increases from the leading end 13 to the trailing end 14 of each saw segment. As described in a co-pending application Ser. No. 604,431, filed Aug. 13, 1975, such a blade construction renders the teeth of each saw segment self-feeding during a cutting operation so that a faster and more accurate cutting operation can be performed thereby. A blade 10 of the type disclosed by FIG. 4 can be utilized as a straight saw blade, or the ends may be joined to form an endless band saw as disclosed in said application Ser. No. 604,431.

Figure 2:
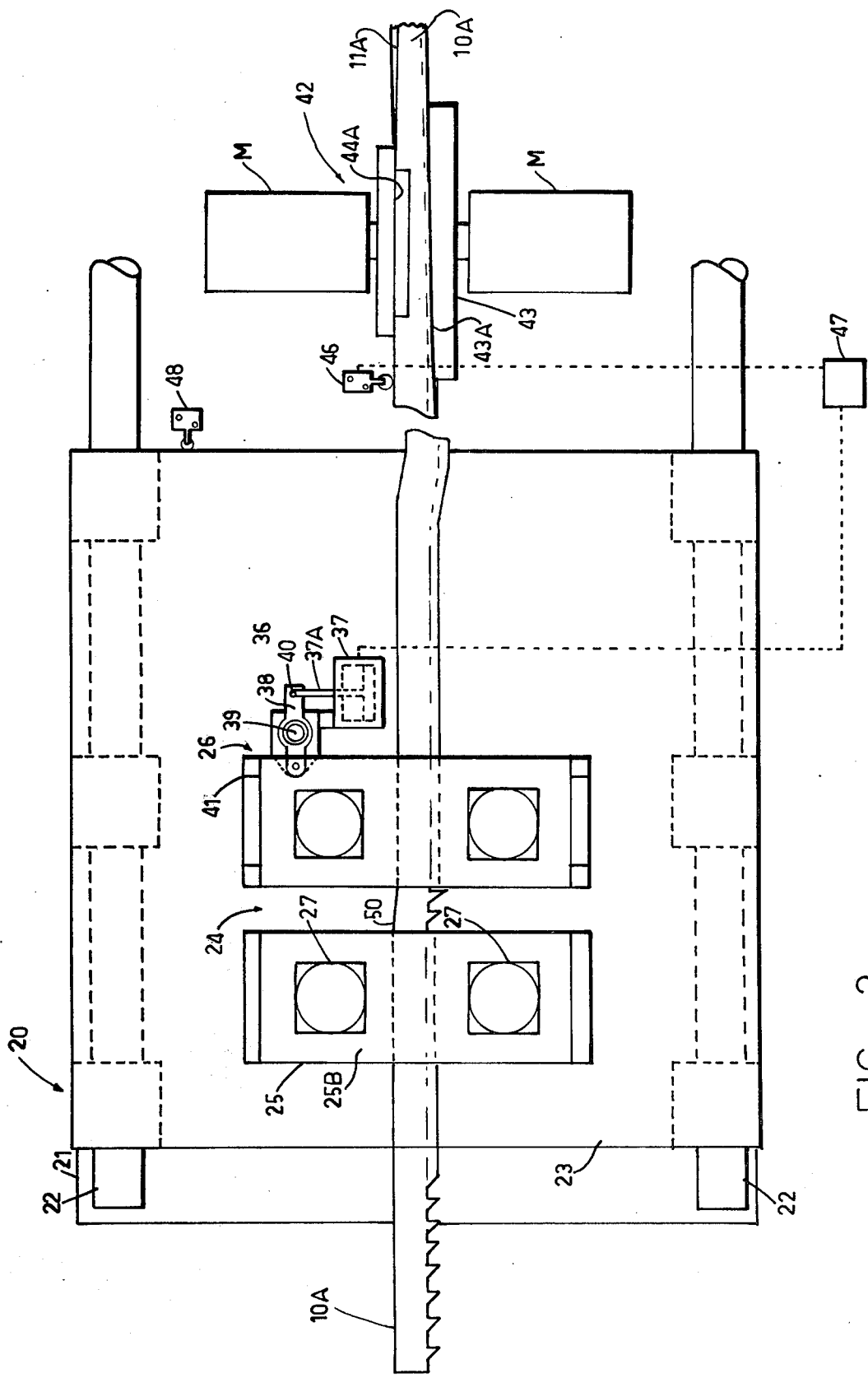
FIG. 2 is a plan view of the apparatus.

Referring to FIGS. 1 and 2, there is shown therein an apparatus 20 by which the saw blade 10 of FIG. 4 can be readily fabricated. As shown the apparatus 20 is disposed adjacent the discharge end of a saw blade making machine (not shown) or from coil of blade being processed for receiving the saw blade 10A as the blade is discharged from the saw blade processing machine. It will be understood that saw blade 10A has been conventionally formed in a manner well known to those skilled in the art. As the saw blade is discharged from the processing machine (not shown) the cutting teeth are formed and define a cutting edge parallel to the back edge.

The apparatus of the present invention includes a table or support 21 having mounted thereon suitable guide rails 22 on which there is mounted a carriage 23 for reciprocal movement. Supported on the carriage 23 to travel therewith is a clamping station 24 for receiving the milled saw blade 10A as it comes off the saw blade making or milling machine (not shown).

In the illustrated embodiment the clamping station 24 includes a pair of clamps 25 and 26 which are normally disposed in spaced apart alignment as best seen in FIG. 2. Clamps 25 and 26 are similarly constructed, except that clamp 26 is rendered laterally moveable with respect to clamp 25 as will be hereinafter described.

Essentially, clamp 25 includes a fixed jaw member 25A which is secured to the carriage 23 and a moveable jaw member 25B. A piston and cylinder assembly 27 is operatively associated with jaw members 25A, 25B to effecting the opening and closing of the jaw members between a blade gripping and non-gripping position. The illustrated arrangement discloses that the piston 27A of the assembly 27 is secured to the fixed jaw member 25A and the cylinder 27B is mounted on the moveable jaw 25B to move therewith, the piston or piston rod 27A extending through aligned opening 28 formed in the moveable jaw member 25B.

Connected to the opposed surfaces of the respective jaw members 25A and 25B is a heater 29 and 30 respectively. It will be understood that heaters 29 and 30 are electrically energized as will be hereinafter described to heat the blade 10A gripped therebetween. However, other types of heaters can be employed. The respective heaters 29 and 30 are electrically and thermally insulated from the jaw members 25A and 25B by suitable insulating material 31.

In the illustrated embodiment two piston and cylinder assemblies 27 are operatively connected to clamp 25, as seen in FIG. 2. It will be understood that the piston and cylinder assemblies can be either operated pneumatically, hydraulically or electrically to effect the actuation of clamp 25.

Clamp 26 is similar to clamp 25, except that the non-vertically moving jaw member 26A is slideably mounted in a dovetail guide 22 so as to render the jaw members 26A, 26B laterally moveable with respect to clamp 25. As described, jaw members 26B is rendered vertically moveable relative to jaw member 26A by means of a piston and cylinder assembly 27 as hereinbefore described. The jaw members 26A, 26B are also each provided with a heater 34 and 35 similar to the heaters 29 and 30 of jaw members 25A, 25B.

A means 36 is provided to effect the lateral movement of clamp 26. As best seen in FIG. 2, the means 36 includes an actuator in the form of a piston and cylinder assembly 37 mounted to one side of moveable jaw member 26A. The piston 37A of assembly 37 is pivotally connected at 40 to a lever 38 which is pivoted intermediate the ends to a suitable pivot 39. The other end of the lever 38 is connected by a pin and slot connection 41 to the laterally moveable jaw member 26A. Thus, it will be noted that jaw members 26A and 26B are rendered laterally moveable in response to the actuation of the piston and cylinder assembly 37. It will be understood that assembly 37 can be electrically, pneumatically or hydraulically operated.

Downstreamwise from the clamping station 24, there is provided a cutting or shearing station 42 for trimming the back edge 11 of the blade 10 for reasons hereinafter described.

In one form of the invention, as shown in FIGS. 1 and 5, the cutting station 42 is defined by a pair of complementary shear rollers 43 and 44. As best seen in FIG. 5, the respective shear rollers are rotatably mounted about suitable axis of rotation. Each of the respective shear rollers 43 and 44 are proviced with a complementary circumscribing flange 43A and 44A for receiving therebetween the saw blade 10A after it has been laterally offset as will be hereinafter described. The arrangement is such that as the saw blade is received between the complementary flanges 43A, 44A of the respective shear rollers, the back edge portion 11A of the saw blade will be trimmed to define a back edge 11 which is coincidental to the respective saw segments 10A, 10B, 10C, etc. Accordingly, it will be noted that the shear cutting edge is defined at 45. In accordance with this invention, the circumferentially disposed cutting edge 45 is progressively formed due to the progressive shoulder 43A, as shown in FIG. 5. The arrangement is such that the circumference of the cutting edge of the shear roller 43 is slightly greater than the length of a saw segment, e.g., 10A, 10B, or 10C. If desired, suitable drive means, e.g., a motor M may be employed to drive the shear rollers to effect the trimming of the back edge of the blade.

As it will be subsequently described, operating means are provided to sequence the actuation of the clamping station between a gripping and non-gripping position and for energizing the electric heaters of the jaw members 25A, 25B and 26A, 26B. In the illustrated embodiment, an operating means in the form of a micro-switch 46 is disposed so as to be responsive to the movement of the blade 10A. The micro switch 46 is located in the line so that when actuated it will activate the piston and cylinder assemblies 27 to close the clamping jaws of clamps 25 and 26 onto the blade. Operatively connected in circuit with the micro switch 46 is a time delay device 47 which will energize the electric heaters 29, 30, 34, and 35 after the jaw members 25A, 25B, 26A, 26B have closed onto the saw. A switching means 48 is disposed so as to be rendered responsive to the movement of the carriage 23 when the carriage has reached the limit of its travel to deactivate the piston and cylinder assembly to effect the opening of the jaw members 25A, 25B and 26A, 26B to release the saw blade; it being understood that the heaters 29, 30, and 34, 35 are deenergized prior to the opening of the clamps 25 and 26.

A spring 51 or other suitable carriage return mechanism is provided to return the carriage 23 to its orignal start position whereby the cycle can be repeated.

The operation of the described machine is as follows:

The saw blade 10A upon being formed by a known processing machine is directed to the clamping station 24 of apparatus 20. With the blade extending through the clamping station 24, the clamps 25 and 26 are closed to grip the blade 10A therebetween. The time delay device 47 in circuit with the operating means 46 for activating the closing of the clamps functions to actuate the heaters 29, 30 and 34, 35 only after the clamps 25 and 26 are closed onto the blade. The saw blade being driven by the drive of the milling machine or processing machine forming the same serves as the power means for advancing the carriage 23 to the right as seen in FIG. 1 at a speed equal to the forming speed of saw blade 10A. As the carriage is transversing its travel, the heaters are heating up the portion of the saw blades between the clamps 25 and 26. When the blade 10A has been sufficiently heated, the actuator 37 which is connected in circuit with the time delay device 47 is actuated to effect a lateral movement of clamps 26 relative to clamp 25. As the saw blade 10A is securely clamped, the lateral shift of clamp 26 will cause a lateral offset to be formed in the blade in the area between the spaced clamps 25 and 26 as indicated at 50. In doing so, the lateral offset portion of the blade 10A to the right of the offset 50 as best seen in FIG. 3, is offset at a slight angle to the portion exiting from the milling machine. The angle of offset can be controlled in accordance with the desired incline cutting edge required by controlling the degree of relative lateral movement of clamp 26. When the carriage has reached its limit of travel, which is determined by the desired linear length of the stepped segments 10A, 10B or 10C, an operating means in the form of a switch 48 is activated which functions to deactivate the pistons and cylinders assembly 27 to open clamps 25 and 26 to release the saw blade 10A. Upon the release of the saw blade, the carriage is returned to its start position by spring 51 whereby the cycle is repeated. By repeating the cycle, a continuous saw blade is formed, as shown in FIG. 3, wherein the saw blade is provided with a series of offset portions, wherein the back edge of each section is inclined at a slight angle relative to the horizontal.

To trim the back edge of the blade to render it coincidental throughout the length thereof as is desired in the finished blade (FIG. 4), a cutting means 42 is provided. The cutting means 42 is disposed so as to receive between the shear rollers 43, 44 the offset saw blade 10A. As best seen in FIG. 5, one edge, e.g., the cutting edge 12 of the blade is disposed in guiding relationship to flange 43A of shear roller 44. The back edge of the blade upon the trimming thereof is guided by flange 44A of shear roller 44. Thus the progressive spacing defined between the complementary flanges 43A and 44A of shear rollers 43, and 44 functions to gauge the cross-sectionsal width of the blade as it is being trimmed in forming a back edge, which is coincidental to the respective saw segments 10A, 10B, 10C. As described, the shear rollers 43 and 44 will trim the offset saw blade 10A along the dash line 52 shown on FIG. 3 to result in a completed saw blade 10 as shown in FIG. 4.

Subsequent to the shearing operation at Station 42, the formed saw blade may be subjected to a further heat treatment and/or rolling operation after which the continuously formed saw blade may be cut to various desired lengths.

FIG. 6 illustrates a modified cutting station 60. In this form of the invention, the cutting or trimming of the saw blade 10A is effected by a laser beam which is located at 61 which trims the back edge of the blade as previously described. To insure that a uniform cut or trim is effected, the trimmed end of the blade 10D is guided between two spaced guide rollers 62, 63 disposed in guiding relationship to the trimmed back edge of blade portion 10D. A resiliently mounted guide roller 64 is disposed in rolling engagement with the opposite end of the blade 10D for biasing the blade against the fixed rollers 62, 63. Thus rollers 62, 63 and 64 function as a means for guaging the progressively formed transverse section of the saw blade segments.

An intermediate portion of blade 10A which is to be trimmed is held in place between a pair of oppositely disposed resilient roller means 65 and 66. In accordance with this invention guide roller 65 comprises a duplicating roller which is operatively connected to guide roller 64 and is rendered responsive thereto. The arrangement is such that guide roller 65 will follow a contour traced by roller 64 so that rollers 65 and 66 trace an identical blade contour as established by guide rollers 62, 63 and 64. In this manner, the laser beam 61 will effect a continuous trim of the blade 10A so that the respective blade segments will be rendered uniform throughout the length of the continuously formed blade 10. In all other respects the apparatus utilized in conjunction with the modified cutting station 60 as described with respect to FIG. 6 is similar to that hereinbefore described.

The described apparatus embodiment is exemplary of an apparatus for performing a method for forming stepped or segmented saw blade 10 for transforming a conventionally made saw blade 10A into a saw blade configuration which greatly increases the cutting efficiency of the blade. The method includes the step of first forming a saw blade 10A in accordance with known technology. The formed saw blade is then heated at spaced intervals to render the heated portion ductile. When the heated sections are rendered ductile the heated portions are transversely displaced in a common plane to form an offset thereof so that the conventionally formed blade 10A is provided with an offset portion 50. The back edge portion of the blade is then trimmed or cut at an angle to the cutting edge 12 of the blade to result in forming a back edge 11 which is coincidental to the respective saw blade sections resulting by the offsetting operation. The method is performed so that the offsets are formed successively at predetermined spaced intervals along the length of blade 10A as it is being continuously formed and without interruption to the blade forming operation. The method of forming such offset blades to define a finished blade with stepped segments with the teeth progressively disposed therealong, as shown in FIG. 4, is thus performed at substantially the same speed as the blade form operation of the milling machine or apparatus making blade 10A.

From the foregoing it will be readily appreciated and understood that variations and modifications may be made to the described method and apparatus for performing the same without departing from the spirit or scope of the invention.

What is claimed is:

1. An apparatus for making saw blades having serially connected stepped cutting segments wherein the cutting teeth in each segment are progressively sloped relative to the back edge of the saw blade so that a transverse section through each said segment progressively increases from the leading to trailing edge of each such segment comprising:
 a moveable carriage for movement between an operative and inoperative position,
 clamping means mounted on said carriage for gripping a saw blade,
 actuating means for actuating said clamping means to grip the saw blade,
 said clamping means including means for heating a portion of the saw blade clamped thereby in the clamped position,
 means for actuating said clamping means to effect a lateral offset in the blade,
 and means spaced from said clamping means in the direction of travel of said moveable carriage toward the operative position thereof for shearing the back edge of blade as said carriage is moved toward operative position to define a back edge which is coincidental to each segment of said blade whereby the cutting teeth of the respective segments are progressively sloped relative to the back edge.

2. The invention as defined in claim 1 wherein said clamping means includes:
 a first clamp and second clamp,
 each of said clamps having relatively moveable jaws for movement between an operative gripping and inoperative non-gripping position,
 and one of said clamps including means for effecting lateral movement therebetween to effect an offset in the blade gripped therebetween.

3. The invention as defined in claim 2 wherein said first and second clamp includes:
 a fix jaw,
 a moveable jaw mounted for movement relatived to said fixed jaw,
 means for moving said jaws between gripping and non-gripping position,
 and said actuating means being operatively connected to the jaw moving means of said respective clamp whereby said jaws of the respective clamp move in unison between operative and inoperative positions.

4. The invention as defined in claim 3 wherein said heating means includes an electric heater connected to the jaws of said clamps,
 and a time delay device disposed in circuit with said activating means whereby said heater is energized a predetermined interval subsequent to the jaws moving to their respective operative position.

5. The invention as defined in claim 4 wherein said jaw moving means includes a piston and cylinder assembly operatively connected to the respective jaws of said clamps.

6. The invention as defined in claim 1 and including a support, and
 means for slideaably mounting said carriage on said support for movement relative thereto.

7. The invention as defined in claim 6 wherein said actuating means includes a sensing switch operating on said blade for moving said clamping means into operative position, and a second sensing switch actuated by said carriage to activate said clamping means to an inoperative position.

8. The invention as defined in claim 7 wherein said carriage is driven toward operative position by said saw blade when said blade is secured by said clamping means.

9. The invention as defined in claim 8 and including a spring means connected to said carriage for returning said carriage toward inoperative position as said clamping means release the saw blade whereby said saw blade is incrementally advanced toward said means for shearing.

10. The invention as defined in claim 1 wherein said shearing means includes a laser beam.

11. The invention as defined in claim 1 wherein said shearing means includes a pair of cutting rolls, one of said cutting rolls having a progressive shoulder for trimming the back edge of each saw segment so as to define a coincidental back edge for each said saw segment.

12. An apparatus for making saw blades having serially formed stepped segments wherein the teeth formed in each segment define a cutting edge which is inclined to the back edge of said blade comprising:
 a support,
 a carriage means mounted on said support,
 means for effecting reciprocation of said carriage relative to said support,
 a clamping station mounted on said carriage for movement therewith,
 said clamping station being adapted to receive a saw blade to be formed,
 said clamping station including a first blade clamping means and a second blade clamping means,
 means responsive to movement of said blade and carriage for actuating said clamping means in unison between an operative gripping position and inoperative non-gripping position,
 means for heating the blade in the gripping position,
 means for laterally moving one of said clamping means relative to the other clamping means when the blade is heated to effect a lateral offset in the blade,
 and means for shearing the back edge of the blade to define a coincidental back edge for said segments.

13. An apparatus for making saw blades having serially connected stepped segments wherein the teeth formed in each section are progressively sloped relative to the back edge of the saw so that a transverse section progressively increases from leading to trailing edge of each segment comprising:
 a support,
 a carriage slideably mounted on said support,
 a clamping station mounted on said carriage to move therewith,
 said clamping station including a first clamp and a second clamp,
 said clamps being spaced from one another,
 each of said clamps having relatively moveable jaw members for movement between a gripping and non-gripping position,
 means connected to said jaw members for activating said jaw members between a gripping and non-gripping position,
 means for slideably mounting one of said clamps for lateral movement relative to the other clamp, means for actuating said one clamp for effecting the lateral movement thereof relative to said other clamp, operating means operatively connected to said jaw member activating means to effect the gripping and non-gripping of said jaw members, said operating means including a first means responsive to the movement of the saw blade to effect the gripping position of said clamps, and second means responsive to the movement of said carriage to effect the non-gripping position of said clamps, said clamps including a heater to heat the saw blade portion clamped thereby, a time delay device operatively connected to said heater to effect the energizing and de-energizing in timed sequence to the gripping and non-gripping of said clamps, and a means for shearing the back edge of the offset segments to define a back edge which is coincidental to each formed saw segment.

14. The invention as defined in claim 13 wherein said shearing means includes a pair of complementary cutting rollers, one of said cutting rollers having a progressive shoulder edge for trimming the back edge of the successive saw segments so as to define a coincidental back edge for each saw segment.

15. The invention as defined in claim 13 wherein said shearing means includes a laser beam, and guide means for positioning said saw blade relative to said laser beam to effect a trimming of the blade to form a back edge which is coincidental to the respective blade segments.

16. The invention as defined in claim 15 wherein said guide means includes oppositely disposed roller means for guaging the transversed sections of a trimmed blade section, and a duplicating tracing roller operatively connected to one of said guage rollers whereby said duplicating tracing rollers traces the contour defined by said guage rollers.

* * * * *